(12) United States Patent
Allen

(10) Patent No.: US 10,937,568 B2
(45) Date of Patent: Mar. 2, 2021

(54) ATTACHMENT OF A FABRIC SLEEVE TO A COMMUNICATIONS CABLE

(71) Applicant: WESCO Distribution, Inc., Pittsburgh, PA (US)

(72) Inventor: Jerry L. Allen, Sarasota, FL (US)

(73) Assignee: WESCO DISTRIBUTION INC., Pittsburgh, PA (US)

( * ) Notice: Subject to any disclaimer, the term of this patent is extended or adjusted under 35 U.S.C. 154(b) by 0 days.

(21) Appl. No.: 16/707,053

(22) Filed: Dec. 9, 2019

(65) Prior Publication Data

US 2020/0243220 A1 Jul. 30, 2020

Related U.S. Application Data

(60) Provisional application No. 62/798,734, filed on Jan. 30, 2019.

(51) Int. Cl.
*H01B 7/18* (2006.01)
*H02G 9/06* (2006.01)

(52) U.S. Cl.
CPC .............. *H01B 7/18* (2013.01); *H02G 9/06* (2013.01)

(58) Field of Classification Search
CPC ............ H02G 9/065; H02G 9/06; H02G 1/08; H02G 3/0481; H01B 7/18
See application file for complete search history.

(56) References Cited

U.S. PATENT DOCUMENTS

| 3,467,761 | A | * | 9/1969 | Plummer | H01B 9/024 |
| | | | | | 174/36 |
| 4,280,258 | A | | 7/1981 | Kunze | |
| 4,371,578 | A | * | 2/1983 | Thompson | F16L 59/12 |
| | | | | | 428/192 |
| 4,409,427 | A | * | 10/1983 | Plummer, III | H01B 7/0838 |
| | | | | | 174/36 |
| 4,442,153 | A | | 4/1984 | Meltsch | |
| 4,602,763 | A | * | 7/1986 | Gaylin | H02G 1/08 |
| | | | | | 254/134.3 FT |
| 4,714,280 | A | * | 12/1987 | Winterhoff | B29C 61/10 |
| | | | | | 138/128 |
| 5,300,337 | A | * | 4/1994 | Andrieu | A44B 18/0069 |
| | | | | | 428/36.1 |
| 5,901,756 | A | * | 5/1999 | Goodrich | F16L 3/233 |
| | | | | | 138/110 |
| 5,997,967 | A | * | 12/1999 | Hawkings | H01B 7/0045 |
| | | | | | 428/194 |
| 6,111,194 | A | * | 8/2000 | Kroulik | F16L 57/06 |
| | | | | | 138/128 |

(Continued)

OTHER PUBLICATIONS

International Search Report for International Application No. PCT/US20/13590 dated Apr. 14, 2020.

*Primary Examiner* — Timothy J Thompson
*Assistant Examiner* — Amol H Patel
(74) *Attorney, Agent, or Firm* — Renner, Kenner, Greive, Bobak, Taylor & Weber

(57) ABSTRACT

An apparatus to be introduced into a conduit includes a cable and a fabric sleeve which extends longitudinally along the cable. The sleeve is secured around the cable by complimentary connectors which extend outwardly from the edges of the sleeve. The connectors can take the form of many configurations including a hook and slot, a ball and socket, a hook and loop, and zipper teeth, among others.

10 Claims, 2 Drawing Sheets

(56) References Cited

U.S. PATENT DOCUMENTS

| | | | |
|---|---|---|---|
| 2005/0098345 A1* | 5/2005 | Niehaus | H02G 3/0487 |
| | | | 174/135 |
| 2009/0314517 A1* | 12/2009 | Allen | H01B 7/1805 |
| | | | 174/124 R |
| 2010/0102286 A1 | 4/2010 | Jordan | |
| 2015/0340128 A1* | 11/2015 | Lee | H01B 7/295 |
| | | | 24/16 R |

* cited by examiner

ATTACHMENT OF A FABRIC SLEEVE TO A COMMUNICATIONS CABLE

CROSS REFERENCE TO RELATED APPLICATION

This application claims priority from U.S. provisional patent application Ser. No. 62/798,734 filed on Jan. 30, 2019 which is incorporated herein in its entirety.

TECHNICAL FIELD

This invention relates to the manner in which a fabric sleeve may be attached to a conventional communications cable so that it is easier to insert the cable into a conduit.

BACKGROUND ART

Positioning communications cables in underground conduits has long been a problem. The friction generated by the contact of the casing of the cable and the conduit, or by the contact of the cable with one or more other cables already in the conduit, can render installation difficult and can damage the cables.

An extremely successful solution to this problem is a fabric innerduct sold under the trademark MAXCELL® by WESCO Distribution, Inc. and shown in U.S. Pat. No. 6,262,371 which is incorporated by reference for whatever details may be necessary to understand the present invention. This innerduct is first positioned in a conduit to divide the conduit into longitudinally extending compartments. A pull tape or rope is then utilized to pull a cable into the compartments. Such allows for insertion with less friction, and when a second cable is introduced into another compartment, the fabric between the cables makes installation easier.

However, a problem still exists for smaller diameter conduits where the fabric innerducts might take up a significant amount of space and therefore be less useful. This problem was solved by attaching a fabric sleeve to the cable thereby eliminating the need for any innerducts. Such is shown in U.S. Pat. No. 9,054,507 which is incorporated by reference for whatever details may be necessary to understand the present invention. While that patent discloses a number of ways that the fabric sleeve may be attached to the cable, the need exists for additional convenient manners in which the sleeve can be attached to the cable.

DISCLOSURE OF THE INVENTION

It is thus an object of one aspect of the present invention to provide a fabric sleeve which can be easily secured around a cable.

It is an object of another aspect of the present invention to provide a fabric sleeve, as above, which has connectors so that the cable can be securely engaged.

These and other objects of the present invention, as well as the advantages thereof over existing prior art forms, which will become apparent from the description to follow, are accomplished by the improvements hereinafter described and claimed.

In general, an apparatus to be introduced into a conduit includes a cable having a length, and a sleeve extending longitudinally along the length and having opposed lateral edges. A first connector extends outwardly at one edge of the sleeve, and a second complementary connector extends outwardly at the opposed edge of the sleeve. The sleeve is positioned around the cable, and the second connector engages the first connector to secure the sleeve around the cable Preferred exemplary sleeves with connectors for attachment to a cable according to the concepts of the present invention are shown by way of example in the accompanying drawings without attempting to show all the various forms and modifications in which the invention might be embodied, the invention being measured by the appended claims and not by the details of the specification.

PREFERRED EMBODIMENTS FOR CARRYING OUT THE INVENTION

Figure 1:
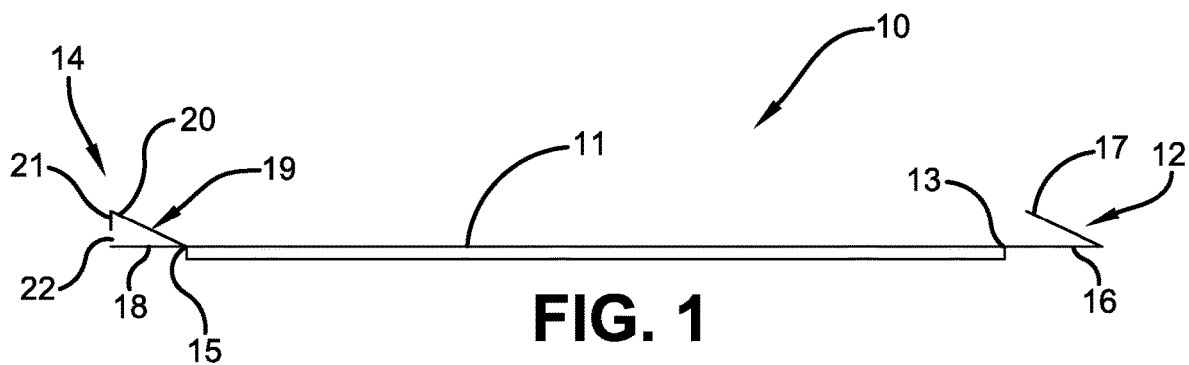
FIG. 1 is a somewhat schematic end elevational view of a sleeve made in accordance with the present invention.

One form of a sleeve made in accordance with the present invention is indicated generally by the numeral 10. An end view of sleeve 10 is shown in FIG. 1 with it being understood that sleeve 10 can be formed of a strip of material having a significant longitudinal length. Sleeve 10 is made up of a pliant, preferably fabric, sheet of material 11. A male connector, generally indicated by the numeral 12, extends outwardly from and is attached to one lateral edge 13 of fabric 11 by stitching, gluing or the like. A complementary female connector, generally indicated by the numeral 14, extends outwardly from and is attached to the opposed lateral edge 15 of fabric 11 by sewing, gluing or the like.

Male connector 12 can be made of a somewhat flexible metallic or plastic material and includes a base portion 16 extending generally laterally outwardly from edge 13 of fabric 11, and a hook portion 17 which extends angularly upwardly and laterally inwardly from the lateral edge of base portion 16.

Female connector 14 can be made of a somewhat flexible metallic or plastic material and includes a base portion 18 extending generally laterally outwardly from edge 15 of fabric sheet 11, and a receiving portion generally indicated by the numeral 19. Receiving portion 19 includes a portion 20 extending angularly upwardly and laterally outwardly from edge 15, and an engagement portion 21 extending downwardly toward base portion 18 from the outer end of portion 21. An opening 22 is formed between the lower end of engagement portion 21 and base portion 18 of female connector 14.

Figure 2:
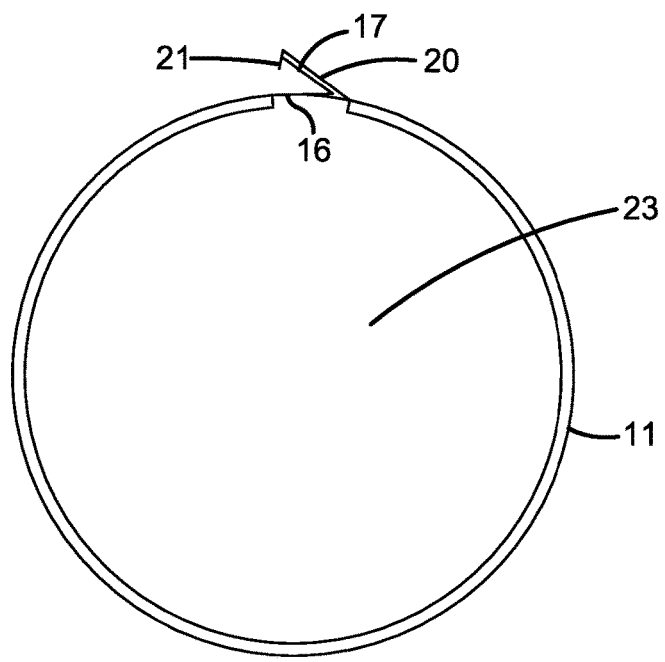
FIG. 2 is a somewhat schematic end elevational view of a cable having the sleeve of FIG. 1 secured around it.

FIG. 2 shows sleeve 10 engaging a conventional cable 23. As such, fabric sheet 11 can be positioned around cable 23, and the male connector 12 is inserted through opening 22 of female connector 14. The tip of hook portion 17 then engages the engagement portion 21 of female connector 14, resulting in the sleeve 10 being attached to cable 23. The lateral width of the fabric sheet 11 can be selected dependent on the size of the cable such that when the fabric 11 is positioned around the cable and the male and female connectors 12, 14 are engaged, the sleeve 10 is attached to cable 23.

Figure 3:
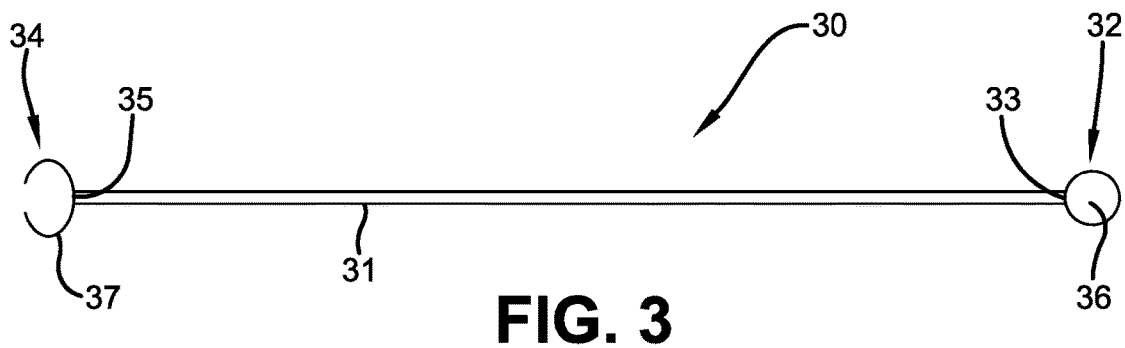
FIG. 3 is a somewhat schematic end elevational view of an alternate embodiment of the sleeve of the present invention.

FIG. 3 depicts an alternate configuration for the sleeve connectors. There, a sleeve, generally indicated by the numeral 30, includes a sheet of fabric material 31 having a male connector 32 extending outwardly from, and attached to, one lateral edge 33, and a complementary female connector 34 attached to and extending outwardly from the opposed edge 35. The male connector is in the form of a ball 36, and the female connector is in the form of a somewhat resilient socket 37. When sleeve 30 is engaging a cable, such as cable 23, ball 36 is engaged by socket 37 to hold sleeve 30 around the cable.

Figure 4:
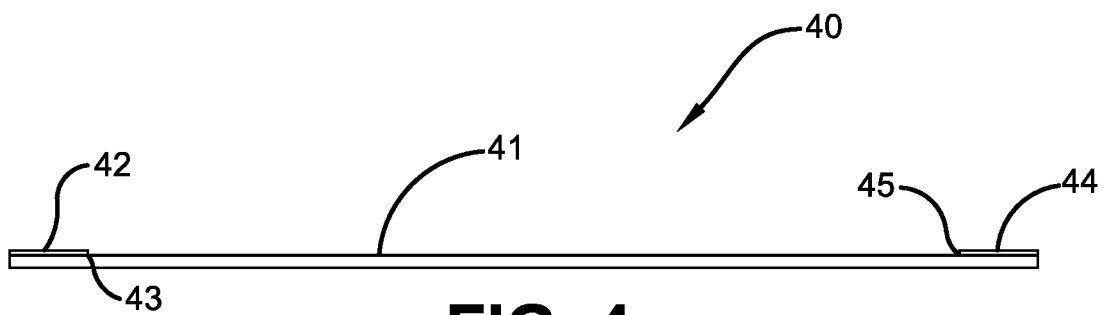
FIG. 4 is a somewhat schematic end elevational view of another embodiment of the sleeve of the present invention.
Figure 5:
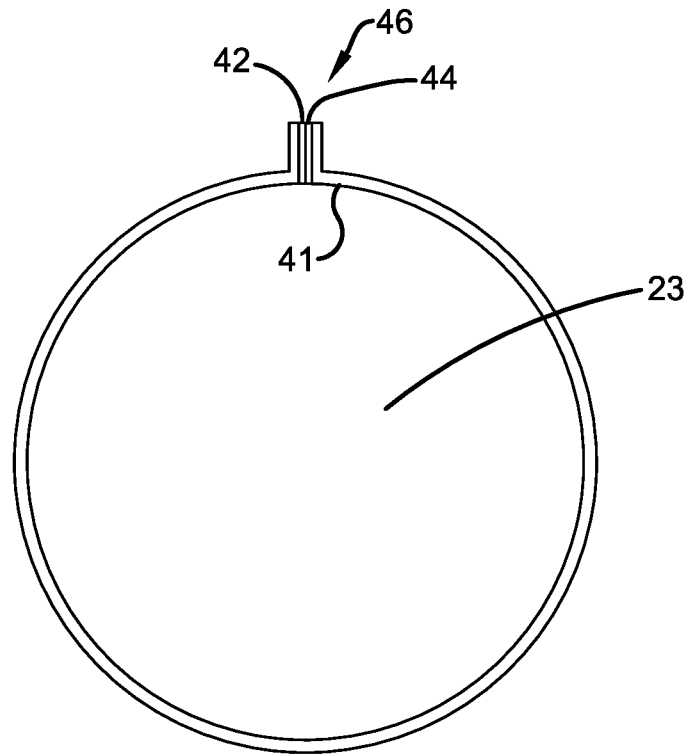
FIG. 5 is a somewhat schematic end elevational view of a cable having the sleeve of FIG. 4 secured around it.

FIG. 4 depicts another alternative configuration for the sleeve connector. There, a sleeve, generally indicated by the numeral 40, includes a sheet of fabric material 41 having a connector 42 attached to and extending outwardly from one lateral edge 43, and a complimentary connector 44 attached to and extending outwardly from the outer lateral edge 45 of fabric sheet 41. One of the connectors 42, 44 can be in the form of the hook portion of a conventional VELCRO® configuration, which is carried by an extension of sheet 41 extending outwardly beyond edge 43, and the other connector 42, 44 can be in the form of the complementary loop portion of the VELCRO® configuration, which is carried by an extension of sheet 41 extending outwardly beyond edge 45. As shown in FIG. 4, the connectors 42, 44 face the same side of the sheet of material 41 such that when sleeve 40 is wrapped around a cable 23, as shown in FIG. 6, the connection of the hooks and loops 42, 44 form with the extensions of sheet 41, a tab or ear 46 which extends longitudinally along cable 23.

Figure 6:
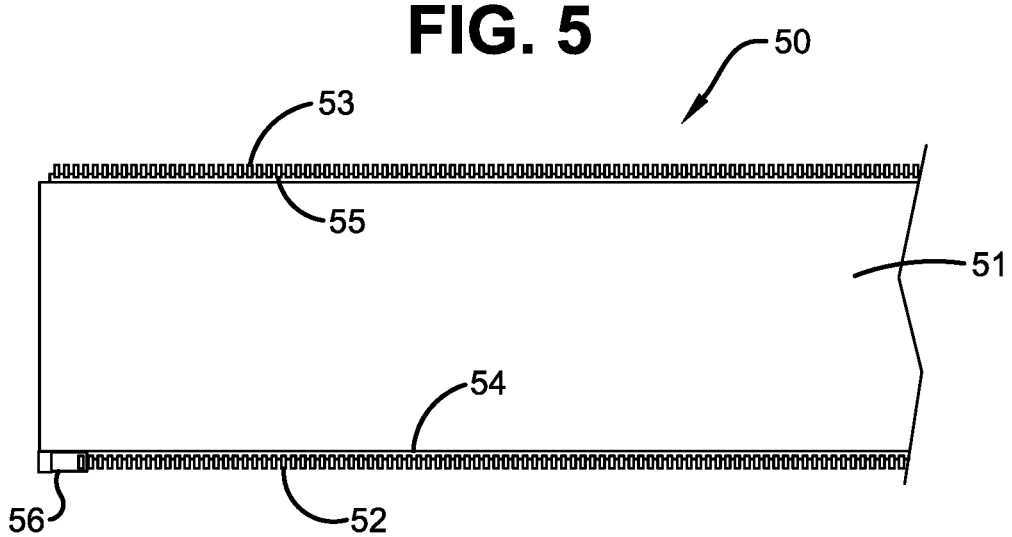
FIG. 6 is a somewhat schematic fragmented top plan view of another embodiment of the sleeve of the present invention.

In another embodiment, shown in FIG. 6, a sleeve, generally indicated by the numeral 50, includes a longitudinally extending sheet of fabric material 51 having complementary zipper teeth 52, 53 extending outwardly from opposed lateral edges 54, 55 of sheet 51, respectively. One set of zipper teeth such as 52, are provided with a conventional zipper pull 56 such that when sleeve 50 is wrapped around a cable, the zipper pull may mesh the zipper teeth in a conventional manner to engage the cable with the sheet 51.

By whatever manner a fabric sleeve is attached to a cable, once positioned around a cable, the sleeve protects the casing of the cable when being installed into a conduit or when another cable is being installed in a conduit already having a fabric-wrapped cable therein. Thus, the cable casings see no friction, and not only are the fabric-wrapped cables easier to install, but also the cables are protected from potential damage during installation.

It should thus be appreciated that a sleeve attached to a cable as described herein substantially improves the art and otherwise accomplishes the objects of the invention.

What is claimed is:

1. An apparatus to be introduced into a conduit comprising a cable having a length, sleeve means to assist the introduction of the cable into the conduit and to protect the cable from friction when the cable is being introduced into the conduit, said sleeve means extending longitudinally along said length and having opposed lateral edges, a first connector extending laterally outwardly at one edge of said sleeve means, and a second connector, complementary to the first connector, extending laterally outwardly at the opposed edge of said sleeve means, wherein said sleeve means is positioned around said cable for said length as said second connector engages said first connector to secure said sleeve means around said cable.

2. The apparatus of claim 1 wherein said first connector is a longitudinally extending hook and said second connector receives said hook.

3. The apparatus of claim 2 wherein said second connector includes a longitudinally extending engagement portion and a longitudinally extending opening, said hook being received through said opening and engaging said engagement portion.

4. The apparatus of claim 1 wherein said first connector is generally in the form of a longitudinally extending ball and said second connector is generally in the form of a longitudinally extending socket, said ball being received in said socket.

5. The apparatus of claim 1 wherein said connectors are in the form of a VELCRO® like attachment, said first connector having a longitudinally extending loop portion and said second connector having a longitudinally extending hook portion.

6. The apparatus of claim 5 wherein said loop portion and said hook portion are on the same side of said sleeve.

7. The apparatus of claim 6 wherein when said sleeve is attached to said cable, said loop portion and said hook portion form a longitudinally extending tab extending radically outwardly from said cable.

8. The apparatus of claim 1 wherein said first connector includes a plurality of zipper teeth extending longitudinally along said one edge, and said second connector includes a plurality of zipper teeth extending longitudinally along said other edge, one of said connectors including a zipper pull so that the teeth of said first connector may mesh with the teeth of said second connector.

9. An apparatus to be introduced into a conduit comprising a cable having a length, a sleeve extending longitudinally along substantially all of said length and having opposed lateral edges, a first connector extending laterally outwardly from one edge of said sleeve, and having a longitudinally extending loop portion, and a second connector, complementary to the first connector, extending laterally outwardly from the opposed edge of said sleeve and having a longitudinally extending hook portion, wherein said loop portion and said hook portion are on the same side of said sleeve, and wherein said sleeve is positioned around said cable for substantially all of said length as said second connector engages said first connector to form a longitudinally extending tab extending radially outwardly from said cable and secure said sleeve around said cable.

10. An apparatus to be introduced into a conduit comprising a cable having a length, a sleeve extending longitudinally along said length and having opposed lateral edges, a first connector in the form of a longitudinally extending hook, extending laterally outwardly from one edge of said sleeve and a second connector, complementary to the first connector, extending laterally outwardly from the opposed edge of said sleeve, and receiving said hook wherein said sleeve is positioned around said cable for said length as said second connector engages said first connector to secure said sleeve around said cable.

* * * * *